Figure 1:
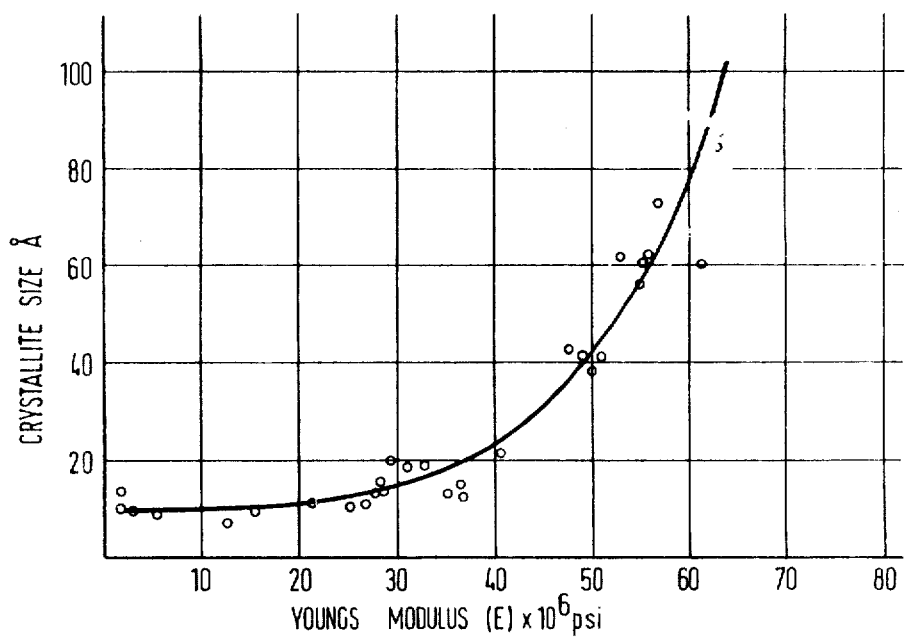

United States Patent

[11] 3,596,092

| [72] | Inventor | John Raymond Marjoram<br>Derby, England |
| [21] | Appl. No. | 822,263 |
| [22] | Filed | May 6, 1969 |
| [45] | Patented | July 27, 1971 |
| [73] | Assignee | Rolls-Royce Limited<br>Derby, England |
| [32] | Priority | May 10, 1968 |
| [33] | | Great Britain |
| [31] | | 22299/68 |

[54] X-RAY DIFFRACTION METHOD FOR DETERMINING THE VALUE OF A MECHANICAL PROPERTY OR PROPERTIES OF A FIBER
6 Claims, 4 Drawing Figs.

[52] U.S. Cl. .................................................. 250/51.5
[51] Int. Cl. ............................................... G01n 23/20
[50] Field of Search ......................................... 250/51.5

[56] References Cited
UNITED STATES PATENTS
2,898,470 8/1959 Khol ............................ 250/51.1

OTHER REFERENCES

Clark; Applied X-rays; McGraw-Hill (1955); pp. 710—718; QC 481 C 47.

Primary Examiner—James W. Lawrence
Assistant Examiner—A. L. Birch
Attorney—Cushman, Darby & Cushman ABSTRACT: The invention concerns a method of examining a fiber which has crystallites in a preferred orientation to determine the value of a mechanical property or properties of the fiber, the method comprising measuring the diffraction of X-rays which have passed transversely through the fiber, and deducing therefrom the value of the said property or properties.

X-RAY DIFFRACTION METHOD FOR DETERMINING THE VALUE OF A MECHANICAL PROPERTY OR PROPERTIES OF A FIBER

This invention concerns a method of determining the value of a polymer mechanical property or properties (e.g. the Young's modulus) of a fiber such, for example, as a carbonaceous fiber formed from polyacrylonitrile or from a cellulose material.

According to the present invention, there is provided a method of examining a length of polymer fiber which has crystallites in a preferred orientation to determine the value of a mechanical property or properties of the fiber, the method comprising continuously passing the length of polymer fiber through a beam of X-rays, measuring the diffraction of X-rays which have passed transversely through the length of polymer fiber by positioning at least one first detector so as to receive substantially a maximum indication, positioning at least one second detector so as to receive an indication whose magnitude with respect to the maximum indication is known, determining the relative positions of the first and second detectors, and deducing therefrom the value of the said property or properties.

A first detector and one of the second detectors may be arranged to lie substantially on a common radius of a circle, and the said first detector and another of the said second detectors may be arranged to lie on the periphery of the said circle.

The invention also comprises apparatus for examining a length of polymer fiber which has crystallites in a preferred orientation to determine the value of a mechanical property or properties of the fiber, comprising an X-ray generator, means for passing the length of polymer fiber continuously through a beam of X-rays from said generator, first and second detectors which are respectively positionable to receive substantially a maximum indication and an indication whose magnitude with respect to the maximum indication is known, means for determining the relative positions of the first and second detectors, whereby to measure the diffraction of the X-rays from said generator which have passed transversely through said length of polymer fiber, and means for deducing therefrom the value of the said property or properties.

The last-mentioned means may comprise a rotary disk which forms part of the surface of a sphere whose center is at the intersection of the said beam and the length of fiber, first and second detectors mounted for movement along a common radius of said disk, means causing the first detector to scan until it receives substantially the said maximum indication, means thereafter causing the second detector to scan along the common radius until it receives the said indication having a predetermined magnitude with respect to the maximum indication, a further detector, and means causing the further detector to scan along the periphery of the circle on which the first detector is located until it receives an indication of predetermined magnitude with respect to the maximum indication.

Figure 2:
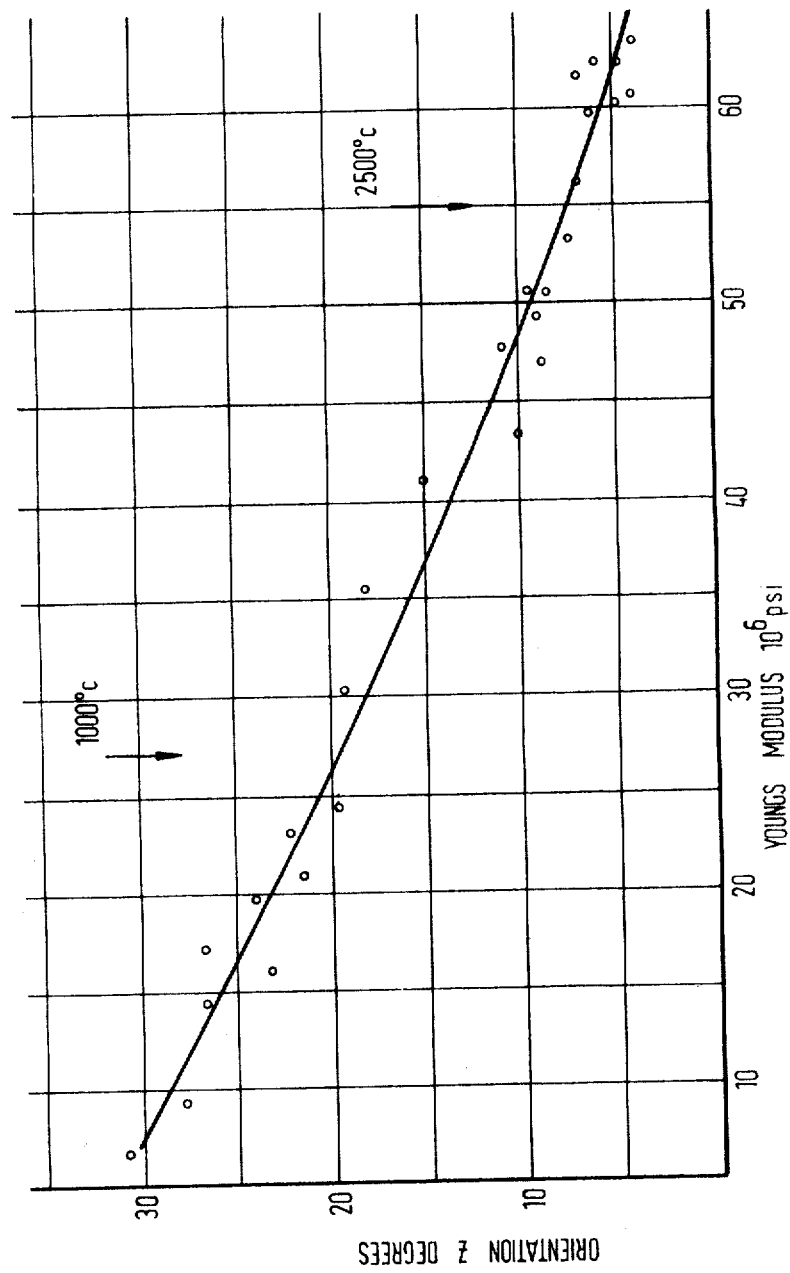
Figure 3:
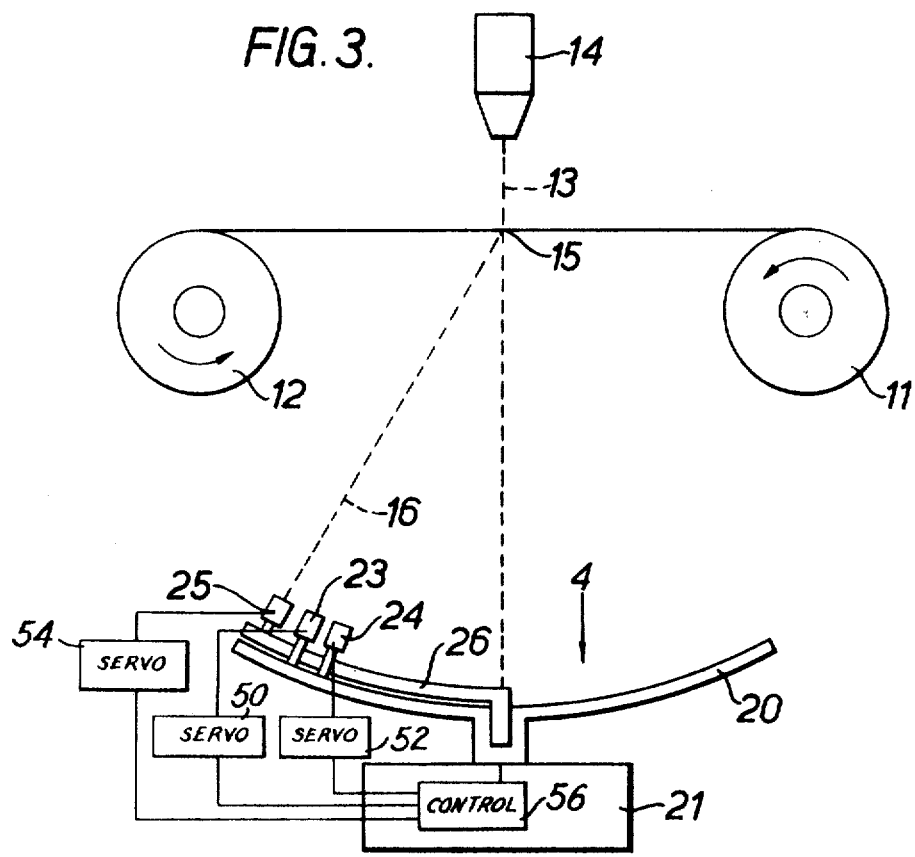
Figure 4:
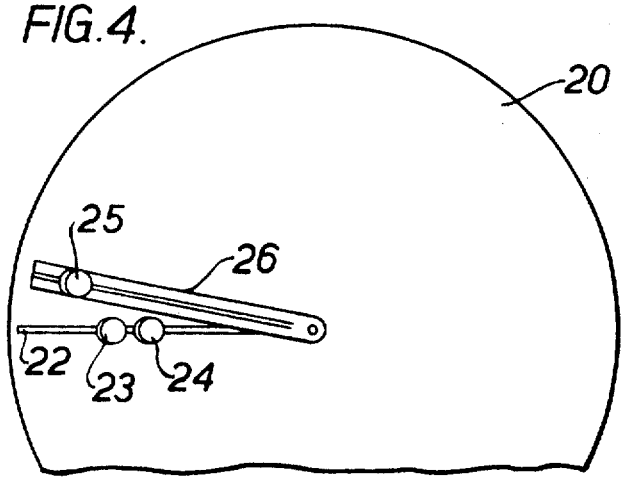

The invention is illustrated, merely by way of example in the accompanying drawings, in which:

FIGS. 1 and 2 are graphs respectively showing the relationship between the mean value of the apparent size of the crystallites of a fiber and the Young's Modulus of the fiber, and the mean value of the apparent orientation of the crystallites of the fiber in relation to the Young's Modulus thereof, FIG. 3 is a diagrammatic view of apparatus according to the present invention for determining the value of a mechanical property or properties of a fiber, and FIG. 4 is a diagrammatic plan view looking in the direction of the arrow 4 of FIG. 3.

The present invention is based upon the discovery that the mechanical properties of a fiber which has crystallites in a preferred orientation, e.g. a fiber produced from a cellulosic material or a carbonaceous fiber formed by carbonizing a polyacrylonitrile fiber, have a definite predetermined relationship with the perfection of the said crystallites.

Thus, in FIG. 1 there is shown a graph whose abscissa indicates Young's Modulus (E) in units of $10^6$p.s.i. and whose ordinate indicates the apparent mean size of the crystallites of the said fiber in Angstrom units, the apparent mean size being measured normal to the graphite basal planes. As will be seen from the graph, there is a definite nonlinear relationship between Young's Modulus and the apparent crystallite size.

Similarly, FIG. 2 shows a graph whose abscissa indicates Young's Modulus in units of $10^6$p.s.i., and whose ordinate indicates the apparent mean value of the preferred orientation of the crystallites (e.g. the orientation of the 002 or 004 graphite plane). Here again it will be noted that there is a nonlinear relationship between the apparent orientation and the Young's Modulus.

As will be appreciated, the interplane spacings of the atoms in the crystal lattice, and the parallelism and the positioning of the atoms in the planes affect the measurement of the said mean size, since the atoms do not have constant lattice spacing nor is their positioning always entirely perfect. Thus the measurement of mean size and orientation is inevitably of apparent mean size and orientation.

The relationship between the apparent orientation of the crystallites and the Young's Modulus does not appear to be affected by differing processing conditions to which the fiber may have been subjected.

It will therefore be appreciated that by taking measurements whose value is related to the apparent size and to the apparent orientation of the said crystallites, it is possible to deduce the value of the Young's Modulus of the fiber.

One particular piece of apparatus for effecting this continuously (or discontinuously) on a length of fiber is illustrated very diagrammatically in FIGS. 3 and 4.

Referring to FIGS. 3 and 4, a length of carbonaceous fiber 10, which has been formed by an suitable method, such for example as a polymer fiber, is passed continuously from a roller 11 to a roller 12. The length of fiber 10 passes continuously through a fine beam 13 of X-rays from an X-ray generator 14 which is provided with both a collimator and a slit (not shown), the beam being collimated to have either a square or circular form. This beam 13 of X-rays intersects the length of fiber 10 at a point 15 and is diffracted on passing transversely therethrough so as to form a cone of nonuniform intensity whose maximum intensity is indicated by the dotted line 16.

Mounted beneath the length of fiber 10 is a rotary disk 20 which is rotatably mounted upon a base 21, the disk 20 forming part of the surface of a sphere whose center is at the point 15. Mounted for movement along a common radius 22 of the disk 20 are detectors 23, 24. A detector 25 is mounted for movement along the length of a radially extending arm 26, the arm 26 being rotatable over the disk 20 and being mounted concentrically thereof.

The detectors 23, 24, 25, are moved by conventional servosystems 50, 52, and 54 respectively which are in turn controlled by an electronic control system which is housed within the base 21. The servomechanisms and electronic control system cause the detector 23 to move along the radius 22 until it detects that it is in the position in which it receives the greatest possible quantity of X-radiation of any point along the said radius. The disk 20 is then rotated until the detector 23 is in the position of maximum indication of X-radiation.

The detector 24 is then moved along the radius 22, until it receives an indication of X-radiation having a predetermined magnitude (e.g. one half) with respect to the maximum indication. The detector 25 is also moved radially along the arm 26 until it lies on the periphery of the circle on which the detector 23 is located. The arm 26 is now rotated until the detector 25 receives one half (or some other predetermined proportion) of the maximum indication received by the detector 23.

The angles between the detectors 23 and 24, as subtended at the point 15, are now measured, and, by using a known calculation, are used to calculate the apparent mean size of the crystallites, while the angle between the detectors 23 and 25 as subtended at the center of the disk 20 is used to calculate the mean value of the apparent orientation of the crystallites.

If desired, it may be arranged that the detectors 24, 25 are disposed diametrically opposite to the detector 23, so that greater space may be provided between the detectors.

Accordingly, by using the graphs shown in FIGS. 1 and 2, the values for the apparent size and orientation of the crystallites can be converted into indications of the Young's Modulus of the fiber.

As will be appreciated, the electronic control system may be arranged automatically to convert the said angles into indications of the Young's Modulus and to provide an automatic printout.

It will thus be appreciated that the present invention is particularly useful in connection with the continuous testing of the Young's Modulus of a carbonaceous fiber immediately after the latter has been formed, for instance from polyacrylonitrile. Normally there is a considerable time delay between the original polyacrylonitrile fiber entering one end of the process and the product leaving the other end. It is therefore very important that any faults in the fiber should be recognized as soon as possible, so that the production process can be amended without forming too much defective material, and the present invention is thus of value in enabling such faults to be rapidly recognized. Moreover, the present invention has the advantage that it can give an average value over a considerable length of fiber and is simpler to operate and less demanding in manpower than a direct method of measuring strength and Young's Modulus.

The X-ray generator 14, the detectors 23, 24, 25, rotary disk 20 and base 21 may be constituted by a unit which may be moved on a trolley base about the plant in which the carbonaceous fiber is produced. It may also be arranged to be traversed in whole or in part, e.g. on rails, both across and along the lengths of fiber. Thus the X-ray generator 14 and detectors 23, 24, 25 may be so traversed, while the power supplies may be stationary. This unit should preferably have a self-contained cooling system so that only an electricity supply thereto is required.

If desired, the movement of the detector 23 to obtain the required maximum indication may be achieved by using two detectors and searching until both give identical indications, the maximum position then being halfway between the two detectors.

I claim:

1. A method of examining a length of polymer fiber having crystallites in a preferred orientation to thereby determine the value of a mechanical property or properties of the fiber, said method comprising the steps of:
    continuously passing the length of polymer fiber through a beam of X-rays,
    measuring the diffraction of X-rays which have passed transversely through the length of polymer fiber by;
    positioning at least one first detector so as to receive substantially a maximum intensity indication,
    positioning at least one second detector so as to receive an intensity indication whose magnitude with respect to the maximum indication is known,
    determining the relative positions of the first and second detectors, and
    deducing therefrom the value of the said property or properties.

2. A method as claimed in claim 1 in which the said mechanical property is the Young'Modulus.

3. A method as claimed in claim 1 in which a first detector and one of the second detectors are arranged to lie substantially on a common radius of a circle, and the said first detector and another of the second detectors are arranged to be on the periphery of the said circle.

4. A method as claimed in claim 1 in which the polymer fiber is carbonaceous fiber.

5. Apparatus for examining a length of polymer fiber having crystallites in a preferred orientation to thereby determine the value of a mechanical property or properties of the fiber, said apparatus comprising:
    an X-ray generator,
    means for passing the length of polymer fiber continuously through a beam of X-rays emitted from said generator,
    first and second detector means which are positionable for receiving respectively substantially a maximum intensity indication and an intensity indication whose magnitude with respect to the maximum indication is known,
    means for determining the relative positions of said first and second detectors, thereby measuring the diffraction of X-rays from said generator which have passed transversely through said length of polymer fiber, and
    means for deducing therefrom the value of the said property or properties.

6. Apparatus as claimed in claim 5 comprising:
    a rotary disk which forms part of the surface of a sphere with its center at the intersection of said beam and length of fiber,
    first and second detectors mounted for movement along a common radius of said disk,
    means causing the first detector to scan until it receives substantially the said maximum indication,
    means thereafter causing the second detector to scan along the common radius until it receives the said indication having a predetermined magnitude with respect to the maximum indication,
    a further detector, and
    means causing the further detector to scan along the periphery of the circle on which the first detector is located until it receives an indication of predetermined magnitude with respect to the maximum indication.